UNITED STATES PATENT OFFICE.

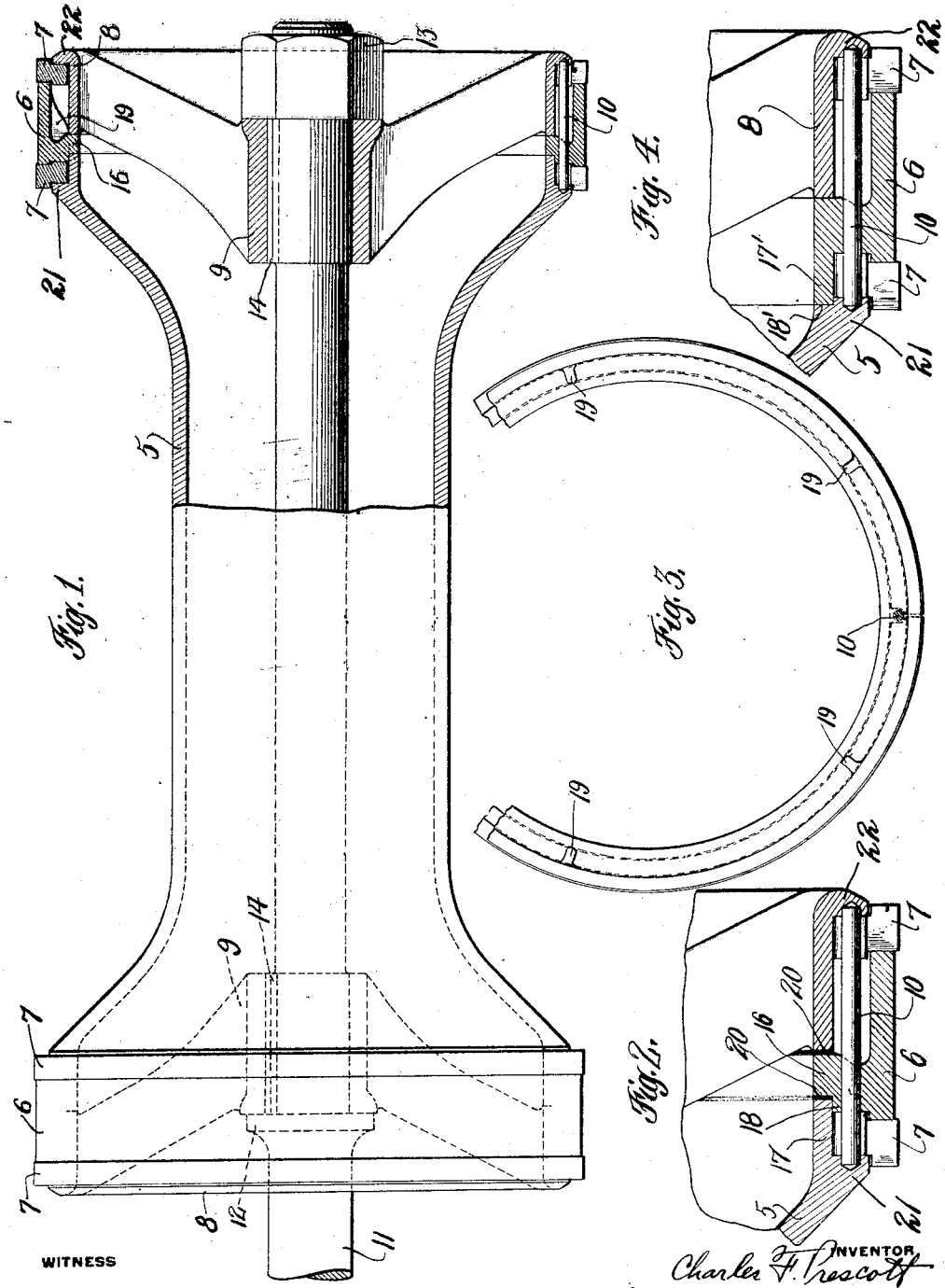

CHARLES F. PRESCOTT, OF BROOKLYN, NEW YORK.

VALVE.

Application filed October 18, 1923. Serial No. 669,359.

My invention relates to valves and valve parts, particularly piston valves for steam engines. I aim to simplify the construction of such valves, to make them stronger and less liable to breakage, to reduce their weight, and to minimize the machine work required and the general cost of their manufacture. My invention is especially advantageous in the case of distribution valves for high speed engines, such as locomotives, since the reduction of the valve weight permitted by the invention reduces the inertia stresses and the consequent wear of the valve gear at high speeds.

How these and other advantages can be realized through the invention will appear from my description hereinafter of the best forms of embodiment known to me.

In the drawings, Fig. 1 is a side view of a piston valve conveniently embodying the invention, with one end in longitudinal mid section.

Fig. 2 is a fragmentary sectional view similar to the lower right-hand portion of Fig. 1, but on a larger scale, and showing an additional feature.

Fig. 3 is a fragmentary end view of the valve construction, from the right of Fig. 1, with certain portions omitted.

Fig. 4 is a view similar to Fig. 2, illustrating a somewhat different construction.

As shown in Figs. 1, 2, and 3, the piston valve comprises, as usual, a hollow body 5 having flanges 21, a "bull-ring" 6 with the split spring packing rings 7, 7 at either side thereof, and a "follower ring" 8 associated with the other parts and having a flange 22 directly helping to hold the outer packing ring 7. The parts 5, 6, and 8 it will be seen, afford grooves for the packing rings 7, 7. In the present instance, each of the packing rings 7, 7 has the usual Z cross-section, with the inner "leg" of the Z hooked inside the bull ring 6 to hold the rings in place when the valve is withdrawn from the valve-chest.

The usual dowel pin 10 lies between the reduced ends of the packing rings 7, 7 at their parting, inside their overhanging outer corners. The follower rings 8, 8 at the opposite ends of the valve body 5 have the usual spider and hub structures 9, 9, and are clamped together and secured to the valve spindle or rod 11 in the usual manner, by the shoulder 12 at one end and the nut 13 at the other. Keys 14 prevent the follower rings 8, 8 from turning on the rod 11.

In the type of built-up piston valve heretofore in general use, the bull-ring 6 was provided with flanges extending first inward beside the packing rings 7, 7, and then laterally inside of them; and the follower ring 8 was extended inside of both of these flanges, substantially to the end of the valve body 5. This construction not only required extra metal to form the bull-ring flanges, but usually resulted in compound bending and shearing stresses in these flanges, from the clamping action of the follower ring. Or if such compound stresses were avoided by making the follower ring abut against the valve body itself inside the bull ring and its flanges, then a compound joint with the valve body was required, in order to provide for centering the follower ring with reference to the valve body; and such compound joint required very careful and expensive machine work.

The construction shown in Figs. 1, 2, and 3 obviates these disadvantages. As here shown, the bull ring 6 has a single inward extending flange portion 16 at its side toward the valve body, but no flange extending laterally within the packing ring 7. The bull ring flange 16 extends and lies between the follower 8 and a flange 17 on the end of the valve body 5, inside the corresponding packing ring 7. Thus only the flange 16 is clamped between the follower 8 and the valve body 5, and the clamping action is a mere simple compression of this flange. In the present instance, this bull ring portion 16 has a rabbeted seat 18 for engaging the end of the valve body portion 17 and centering the bull ring on the valve body. At the other side of the bull ring flange 16 are a number of radial strengthening ribs or webs 19 (Fig. 1) cast integral with flange and bull ring; their inner edges terminate short of the inside of the flange 16 and engage the follower 8 internally, to center it with reference to the bull ring 6 and, consequently, with reference to the valve body 5. If desired, the width of the packing ring grooves can be varied and regulated by means of annular shims 20 inserted at either side of the bull ring portion 16, as shown in Fig. 2.

The reduction in material and in weight by this construction as compared with the old construction described above will readily be appreciated. In addition, there is a considerable reduction and simplification in machine work.

In the construction shown in Fig. 4, the flange 17' is on the bull ring portion 16, and the seat 18' is on the valve body 5. In other respects, however, the construction is like that of Figs. 1 to 3; accordingly, various parts and features are marked with the same reference characters as in Figs. 1 to 3, as a means of dispensing with merely repetitional description.

I claim:

1. A valve of the character described comprising a spindle, follower rings secured thereto, bull rings centered on said follower rings, a valve body centered on said bull rings, packing rings centered on said follower rings, and packing rings centered on said valve body.

2. A valve of the character described comprising a spindle, follower rings, a valve body, bull rings having flanges projecting inwardly between said follower rings and said body, and means on said spindle for rigidly clamping the flange of said bull rings between the follower rings and the valve body.

3. A valve of the character described comprising a spindle, a follower ring, a valve body, and a bull ring having a flange projecting inwardly between the follower ring and the valve body and providing packing ring grooves between the follower ring and the bull ring and between the valve body and the bull ring.

4. A valve of the character described comprising a spindle, a follower ring, a valve body, and a bull ring having a flange projecting inwardly between the follower ring and the valve body and providing packing ring grooves between the follower ring and the bull ring and between the valve body and the bull ring, together with shims interposed between said flange and the follower ring and between said flange and the valve body.

5. A valve of the character described comprising a spindle; a follower ring having an outwardly projecting flange; a valve body also having an outwardly projecting flange; and a bull ring having a flange projecting inwardly between the follower ring and the valve body, said bull ring forming packing ring grooves with the flanges on the follower ring and valve body.

6. A valve of the character described comprising a spindle; a follower ring having an outwardly projecting flange; a valve body also having an outwardly projecting flange, a bull ring having a flange projecting inwardly between the follower ring and the valve body, said bull ring forming packing ring grooves with the flanges on the follower ring and valve body; and shims interposed between said inwardly projecting flange and the follower ring and between said inwardly projecting flange and the valve body, to vary the width of the packing ring grooves.

In testimony whereof, I have hereunto signed my name.

CHARLES F. PRESCOTT.